United States Patent Office 3,336,414
Patented Aug. 15, 1967

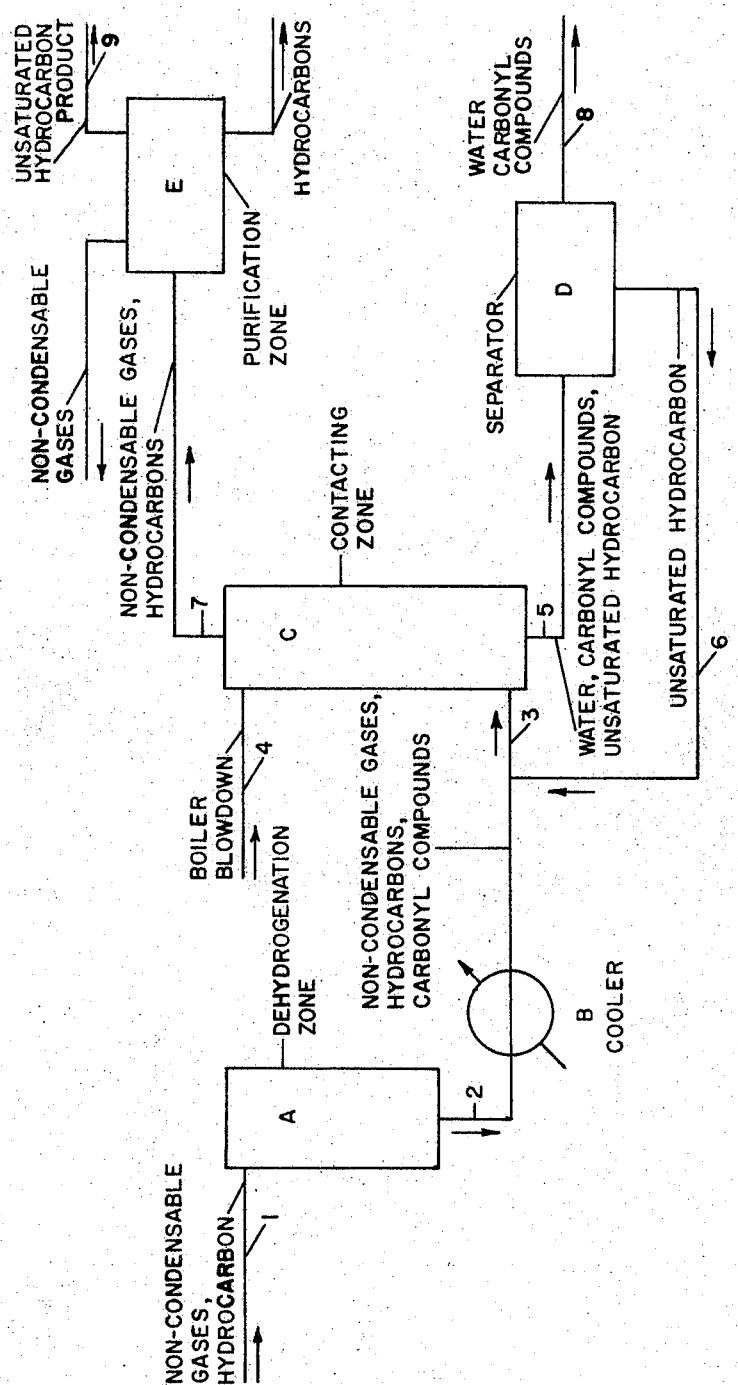

3,336,414
COMBINED METHOD OF DISPOSAL OF WASTE AND PURIFICATION OF CHEMICAL PRODUCT
Rudolph C. Woerner, Houston, Tex., assignor to Petro-Tex Chemical Corporation, Houston, Tex., a corporation of Delaware
Filed Mar. 8, 1966, Ser. No. 541,881
8 Claims. (Cl. 260—681.5)

This application relates to a process for the purification of unsaturated organic compounds from a gaseous mixture containing the unsaturated organic compound, relatively noncondensable gases and a minor portion of oxygenated compounds. This application further relates to a method for the efficient disposal of aqueous waste compositions of high pH and relatively high solids contents.

Unsaturated organic compounds are commercially produced by the catalytic dehydrogenation of more saturated organic compounds. For example, diolefins are produced in large quantities by the dehydrogenation of saturated hydrocarbons or olefins in fixed bed reactors. Improved processes whereby higher conversions, yields and selectivities of product as well as other improvements are desired.

Improved processes for the preparation of unsaturated hydrocarbons such as butenes, butadiene-1,3, isoprene and styrene are processes whereby hydrocarbons such as butane, butene, isopentenes or ethyl benzene are dehydrogenated at elevated temperatures in the presence of catalysts and oxygen. Superior results and yields of product are thereby obtained. However, the product streams contain not only the desired unsaturated hydrocarbon, but also various oxygenated compounds such as aldehydes and other carbonyl compounds. When air is used as the source of the oxygen, the effluent from the dehydrogenation reactor will contain large quantities of relatively noncondensable gases, such as nitrogen. The gaseous effluent will also contain varying amounts of steam. It is one of the principal objects of this invention to provide a process for the separation of the carbonyl and other oxygenated compounds from the gaseous stream containing the hydrocarbons.

The oxygenated compounds are a serious contaminant in the unsaturated hydrocarbon product and must be essentially completely removed in order to have a product of suitable purity, e.g., a product having on the order of a few parts per million carbonyl compounds. The essentially complete removal of the oxygenated compounds is quite difficult for several reasons. In the first place, the oxygenated compounds constitute only a very minor percentage of the gaseous stream to be purified. Normally the carbonyl compounds will only constitute less than 5 mol percent of the gaseous stream to be purified and more usually may constitute such as less than or up to 2.5 mol percent of the gaseous stream. The oxygenated compounds are therefore quite difficult to remove because of their low concentrations in the gaseous stream. In addition, the oxygenated compounds may be difficult to separate from the hydrocarbons regardless of their relative concentration. Azeotropes may form between the oxygenated compounds and various hydrocarbons. For instance, an azeotrope is formed between acetaldehyde and butadiene-1,3. It is therefore an object of this invention to promote a process for the essentially complete removal of carbonyl compounds from a gaseous stream containing only minute quantities of carbonyl compounds based on the total gaseous stream.

According to this invention a straightforward and efficient process has been provided for the treatment of the gaseous stream to separate the oxygenated compounds. The gaseous stream is intimately contacted with a particular aqueous contacting composition. The aqueous contacting composition has a pH of at least about 10 and comprises at least about 200 weight parts per million of total dissolved solids.[1] A suitable contacting composition is one wherein the phenolphthalein alkalinity (calculated as $CaCO_3$) is at least or about 50 weight parts per million, the methyl orange alkalinity (calculated as $CaCl_3$) is at least or about 50 weight parts per million. The composition may also contain chloride in an amount of at least 100 weight parts per million (calculated as NaCl) and silica in an amount of at least 10 weight parts per million (calculated as $SiO_2$). Normally the composition will contain at least 95 weight percent water.

Therefore one object of this invention is to provide a method for the treatment of gaseous streams to separate oxygenated compounds. Another object is to provide a method for the disposal of certain types of aqueous waste compositions. One type of industrial waste is an aqueous composition of high pH and relatively high dissolved solids content. Typical compositions of this type are formed as high pH waste products from the operation of water boilers. In most states there are restrictions preventing discharge of compositions of this nature into the stream and water supply. For example, the high pH of the water must be neutralized. Consequently, it would be advantageous to have a method for the treatment of these waste products at low cost.

Many industrial waste products also have a high heat content. If these compositions are simply treated as such the heat content may be lost. Moreover, it may be necessary to utilize cooling water to bring these streams to a suitable temperature for treatment. Ordinarily waste water having a high heat content may be used as a heating medium such as in heat exchangers. However, if the waste water has a high content of dissolved solids it may be unsatisfactory for this use because it will plug the tubes of the heat exchangers. Therefore, another object of this invention is to provide a method for utilizing the heat content of aqueous compositions containing a high level of dissolved solids.

These and other objects of this invention may be accomplished according to the description of the invention which follows.

One type of aqueous waste having high pH, high dissolved solids and a high heat content is obtained when water boilers are cleaned or purged by discharging what is referred to as boiler blowdown or blow-off (hereinafter referred to as blow-down). After a period of operation, boiler tubes contain a relatively high concentration of dissolved solids as a residue from the water distilled in the boiler. As a matter of convenience, generally the boiler blowdown is taken from the boiler continuously from what is known as the steam drum. Thus, when the water remaining in the boiler reaches a certain level of concentration of dissolved solids, these dissolved solids must be removed to prevent plugging of the boiler tubes. At this time, the water containing the relatively high concentration of dissolved solids is discarded from the boiler as boiler blow-down. The operation of water boilers is described, for example, in Severns and Degler System, Air and Gas Power, Third edition, John Wiley and Sons, 1939. The blow-off or blow-down of the boiler to remove dissolved solids is described such as at page 139 of Severns et al.

Boiler blow-down normally has a pH of at least 10 or 10.5. Usually the total dissolved solids will range from ---
[1] All test methods for the aqueous compositions of this application are described in Betz Handbook of Industrial Water Conditioning, sixth edition, 1962, Betz Laboratories Inc., Philadelphia, Pa.

250 to 7500 weight parts per million of dissolved solids and also usually the phenolphthalein alkalinity will range from about 100 to 1000 parts per million alkalinity calculated as $CaCO_3$, the methyl orange alkalinity from 100 to 1000 parts per million calculated as $CaCO_3$, the chlorine from 150 to 2500 weight parts per million chloride calculated as NaCl, the sulfite from .5 to 100 weight parts per million sulfite calculated as $SO_3$, and the silica from 15 to 250 or 450 weight parts per million silica calculated as $SiO_2$.

In the past boiler blow-down has been considered as a waste material which had to be treated prior to disposal. As a consequence, boiler blow-down normally must be treated to reduce the pH and to insure that no objectionable dissolved solids are dumped into the water supply. According to this invention, it has been discovered that this waste material can be utilized in a manner such that instead of having a negative value, it has a positive value as a treating composition for the removal of oxygenated compounds from organic compounds contaminated with oxygenated compounds. This discovery was surprising in view of the high concentration of dissolved solids in the boiler blow-down. It might have been thought that the use of boiler blow-down as a contacting medium in apparatus such as bubble cap columns would plug the contacting apparatus due to the high concentration of solids. It has been discovered, however, that this is not the case and that there are even some improved results in the operation of the apparatus when boiler blow-down is used as the contacting medium.

As mentioned above, one of the principal advantages of this invention is the discovery that waste materials such as boiler blowdown may be rendered innocuous and suitable for disposal to the water supply. By the use of this invention, the pH of the boiler blowdown is reduced to a suitable level for disposal of the water. The water leaving the zone in which the boiler blowdown is contacted with the gaseous composition contaminated with oxygenated compounds may be sewered directly or may be treated further if desired. At any rate, the pH of the boiler blowdown may be effectively reduced without the addition of any added neutralizing agent. Suitably the aqueous composition leaving the contacting zone will be at a pH of no greater than 8 and preferably the pH will be 7.5 or less.

The boiler blowdown as it leaves the boiler will normally be at a temperature such as at least about 200° F. or 300° F. or higher. According to this invention, the heat content of this material may be utilized by feeding the boiler blowdown directly into the contacting zone wherein the boiler blowdown contacts the gaseous organic compound contaminated with oxygenated compounds. Thus, the heat content of the boiler blowdown may be utilized to heat the incoming gases to the desired temperature in the contacting zone and consequently, the heat content of the boiler blowdown may be utilized rather than dissipated. Although it is a feature of this invention that the boiler blowdown or other aqueous composition be at an elevated temperature, it is possible to employ the aqueous composition at a lower temperature such as ambient temperature. Thus the heat content of the boiler blowdown may, if possible, be utilized prior to feeding the blowdown to the contacting zone.

The gaseous mixture to be treated containing the oxygenated compounds may be obtained from a variety of sources. However, the invention is particularly suitable for the purification of gaseous effluents containing unsaturated hydrocarbons, non-condensable gases and carbonyl compounds including those resulting from the oxidative dehydrogenation of hydrocarbons utilizing air or oxygen diluted with non-condensable diluents such as nitrogen or helium. Examples of oxidative dehydrogenation processes are disclosed, e.g., in Examples II and III of U.S. 3,067,272 and in British Patent 956,048.

Hydrocarbons to be hydrogenated may be acyclic, cycloaliphatic or alkyl phenyl hydrocarbons of 3 to 9 carbon atoms which contain at least two adjacent carbon atoms, each of which carbon atom has at least one hydrogen atom attached. The dehydrogenation will produce compounds having double and/or triple bonds. Thus, butadiene-1,3 and/or vinylacetylene may be produced from butene-1 or butene-2 or mixtures thereof, and isoprene may be produced from any of the methyl butenes, such as 2-methyl butene-1, 2-methyl butene-2 or mixtures thereof. Isoprene may also be produced from methyl butanes, such as 2-methyl butane. Olefins and diolefins may be produced from saturated hydrocarbons; for example, vinyl acetylene, butadiene and butene or mixtures thereof may be produced from n-butane. A mixture of monoolefins and diolefins may also be produced, such as a mixture of butadiene-1,3 and butenes from a feedstock of a mixture of n-butane and butene. Cyclohexane may be dehydrogenated to cyclohexene and/or benzene. Ethyl benzene or ethyl cyclohexane may be dehydrogenated to styrene. Good results have been obtained with a feed containing at least 50, such as at least 75, mol percent of an acyclic aliphatic hydrocarbon, such as the hydrocarbons of 4 to 5 carbon atoms having a straight chain of at least four carbon atoms, e.g., those having a single double bond, preferred are the monoethylenically unsaturated compounds or mixtures of saturated and monoethylenically unsaturated compounds.

Oxygen will generally be supplied to the dehydrogenation zone in the range of about 0.20 mol of oxygen to 2.0 or 3.0 mols of oxygen per mol of hydrocarbon to be dehydrogenated. A preferred range for the oxygen is from about 0.3 to 1.50 mols of oxygen per mol of hydrocarbon to be dehydrogenated. Either air, oxygen, or oxygen diluted with a diluent such as nitrogen, helium, and the like, may be utilized. Steam may be fed to the dehydrogenation zone in amounts such as from about 2 to 40 mols of steam per mol of hydrocarbon to be dehydrogenated. An advantageous range is from 2 to 20 mols of steam per mol of hydrocarbon.

A preferred embodiment of the invention is illustrated in the drawing. A gaseous mixture of the hydrocarbon to be dehydrogenated, air and steam are fed by line 1 to the dehydrogenation zone A. The dehydrogenation reaction may be conducted in the absence of contact catalysts, but better results are obtained if the reaction is conducted in the presence of metal or metal compound catalysts. The dehydrogenation reactor may be a fixed or fluid bed reactor. Reactors conventionally used for the dehydrogenation of hydrocarbons to butadiene may be employed. The total pressure in the dehydrogenation zone may suitably be about atmospheric pressure. However, higher pressures or vacuum may be used. Pressures such as from about atmospheric (or below) up to about 100 to 200 p.s.i.g. may be employed. The dehydrogenation reaction will normally be conducted at a temperature of reaction between about 600° F. to about 1500° F. or higher, although generally the maximum temperature in the reactor will be within the range of about 700° F. and 1300° F. The temperature of the reaction is measured at the maximum temperature in the reactor. The flow rates of the reactants may be varied quite widely and will be dependent somewhat on whether fixed or fluid bed reactor is employed. Good results have been obtained with flow rates of the hydrocarbon to be dehydrogenated ranging from about ¼ to 25 liquid volumes of hydrocarbon to be dehydrogenated per volume of reactor per hour, with the volumes of hydrocarbon being calculated as the equivalent amount of liquid hydrocarbons at standard conditions of 15.6° C. and 760 millimeters of mercury absolute. For the purpose of calculating flow rates, the reaction zone is defined as the portion of the reactor which contains catalyst and which is at a temperature of at least 600° F. In other words, the volume of the reaction zone is equivalent to the empty volume of the catalyst zone. The residence or contact time of the reactants in the dehydrogenation zone depends on several factors involved in the reaction. Contact times such as about 0.001 to about 5, 10 or 20 seconds have been found to give excellent results. Under certain conditions, higher contact times may be utilized. Contact time is the calculated dwell time of the reaction mixture in the reaction zone assuming the mols of product mixture are equivalent to the mols of feed.

The effluent 2 from the dehydrogenation zone will contain the impure unsaturated hydrocarbon products, various impurities including oxygenated hydrocarbons, noncondensable gases and perhaps some unconverted feed or unconverted hydrocarbon, oxygen and steam. If air were used as the source of oxygen, nitrogen will be present in relatively large quantities as a noncondensable gas. Steam may be present in an amount of up to 96 mol percent of the total effluent, such as from about 5 to 96 mol percent. The organic phase including dehydrogenated product, any unreacted feed, oxygenated hydrocarbons, polymer and tar and precursors thereof and any organic decomposition products usually range from about 1 to 50 mol percent of the effluent and generally will be within the range of or about 3 to 30 or 35 mol percent of the effluent. The noncondensable gases,[2] such as nitrogen or $CO_2$, will usually be present in an amount of from or about 20 to 93 mol percent of the total effluent, but more often will be within the range of about 40 to 80 mol percent.

The effluent gases 2 leaving the dehydrogenation zone will generally be at a temperature of about or greater than 600° F. or 700° F. to 1600° F. depending upon the particular dehydrogenation process. The reactor effluent may be cooled by any means or combination of means in cooling zone B as by quenching followed by employing waste heat boilers, condensers, vapor separators, and the like. Preferably water, such as the major portion of any water present in the effluent, will be removed as condensed steam from the gaseous effluent during this cooling operation. This cooled gaseous stream 3 may preferably then be compressed and conducted to the contacting zone C.

The gaseous composition 3 to be fed to contacting zone C will comprise, exclusive of any water present, about or from 3.5 to 80 mol percent of unsaturated hydrocarbon, about or from 0.005 to 2.5 mol percent of carbonyl compounds,[3] and about or from 20 to 93 mol percent of noncondensable gases (i.e., noncondensable under the conditions of zone C), all based on the total mols of gaseous composition 3 being fed to contacting zone C, exclusive of any water. Included in the noncondensable gases will be any nitrogen, oxygen, CO or $CO_2$, and the like. The oxygen content may vary, but suitably will be less than 10 mol percent of 3. Steam may also be present in 3 in an amount from 0 to 20 or up to such as 50 mol percent of the gaseous composition 3. Also present in the gaseous mixture 3 may be unconverted hydrocarbons such as olefins or saturated hydrocarbons and hydrocarbon by-products.

A preferred composition 3 to be fed to zone C will comprise, exclusive of any water present, about or from 5 to 65 mol percent of unsaturated hydrocarbons, about or from about 0.05 to 1.2 mol percent of carbonyl compounds and about or from 45 to 89 mol percent of the noncondensable gases. A particularly preferred composition 3 contains about or from 8 to 65 mol percent butadiene-1,3, about or from 0.1 to 40 mol percent butene, and about or from 40 to 75 mol percent nitrogen.

The contacting zone C may comprise any type of equipment or apparatus for intimately contacting gases and liquids, such as tray columns including cross-flow plate and counterflow plate types, bubble cap columns, packed columns and spray systems including spray towers (open or packed), cyclonic spray towers, venturi scrubbers, and so forth. Preferred contacting equipment is plate columns (may be perforated, valve, bubble cap, and so forth) and packed columns.

The conditions in the contacting zone C preferably will be such that under the pressure in zone C the temperature will be from at least as high as the dew point of the unsaturated hydrocarbon being fed in 3 to a temperature of less than the boiling point of water under the conditions in zone C. Also, the conditions in zone C will preferably be maintained such that the phase equilibrium constants K[4] for the carbonyl compounds will be no greater than 15 and preferably will be 10 or less. Preferred K values are from .1 to 6. Preferably, the contacting zone will be at a pressure of at least 30 p.s.i.a., such as at least 60 p.s.i.a. When the unsaturated hydrocarbon in 3 is a $C_4$ or $C_5$ hydrocarbon or mixtures thereof, the contacting zone will be maintained at a temperature between about 60° F. and 180° F. For example, if a column type contacting zone is utilized both the bottoms and the overhead temperature must be within the temperature range of 60° F. and 180° F. Preferably, the temperature in the contacting zone will remain between about 80° F. and 110° F. for $C_4$ hydrocarbons and between 120° F. and 160° F. for $C_5$ hydrocarbons. When the hydrocarbons are $C_4$ to $C_5$, the pressure in the contacting zone will preferably be maintained within the range of about 110 p.s.i.a. to 170 p.s.i.a. and better results are obtained if the pressure is within the range of about 130 to 170 p.s.i.a.

In the contacting zone C the composition 3 is contacted with an aqueous composition 4 and the contacting may be by any of the means described above. Preferably, the aqueous composition 4 will contact the gases 3 via counter-current flow as shown in the drawing. The aqueous composition containing the dissolved solids and the relatively high pH has been described above. Excellent results have been obtained using boiler blowdown.

The exit gases 7 from the contacting zone preferably comprise or consist of about or from 3.5 to 80 mol percent unsaturated hydrocarbons and about or from 20 to 93 mol percent noncondensable gases. The exit gases preferably comprise or consist of 5 to 65 mol percent of unsaturated hydrocarbons and from 45 to 89 mol percent noncondensable gases. At least 90 mol percent of the carbonyl compounds entering the contacting zone as 3 will be removed from the gaseous stream in the contacting zone and generally higher mol percent removal is achieved such as at least 97 percent or at least 99 mol percent removal.

Also from the contacting zone will be taken off an aqueous solution 5 which contains water and dissolved therein based on the total mols of the aqueous solution about or from 0.01 to 2.5 mol percent carbonyl compounds, and preferably from about 0.025 to 1.0 mol percent carbonyl compounds. In order to achieve the maximum overall benefit from this invention, it has been found advantageous to operate the contacting zone in a manner and under conditions such that a portion of the unsaturated hydrocarbon entering the contacting zone C will be dissolved in the aqueous solution 5. The dissolved hydrocarbon in the aqueous solution 5 amounts to about or from 0.005 to 0.5 mol percent of unsaturated hydrocarbon of the composition 5 and this dissolved unsaturated hydrocarbon may be equivalent to about or from 0.002 to 4.0 mol percent of the unsaturated hydrocarbon entering the contacting zone C in the stream 3. According to a suitable operation the aqueous solution 5 contains dissolved therein from 0.01 to 2.0 mol percent of the un-

---

[2] The term "noncondensable" or "inert noncondensable" gases refers to those gases, other than hydrocarbons, such as nitrogen, $CO_2$ and CO, which do not condense under the conditions encountered.

[3] All references to overall quantities of carbonyl compounds are determined by ASTM Method D-1089 and reported as acetaldehyde. Generally, the carbonyl compounds will have from 2 to 8 carbon atoms, e.g., from 2 to 6 carbon atoms when a $C_4$ to $C_6$ compound is being dehydrogenated, and will have from 1 to 2 carbonyl groups.

[4] Mol fraction in vapor phase divided by mol fraction in liquid phase. Typical calculations for gaseous-liquid composition may be found, e.g., in the article by Wayne C. Edmister, reprinted as Part 5 of the Hydrocarbon Absorption and Fractionation Process Design Methods published by Petro/Chem Engineer, Dallas, Tex.

saturated hydrocarbons. The unsaturated hydrocarbons so dissolved in the aqueous solution 5 may then be discarded, but it is a feature of this invention that the unsaturated hydrocarbons may be separated in a high purity from the carbonyl compounds in a separator D. The unsaturated hydrocarbon 6 has been found to be of high purity in terms of freedom from carbonyl compounds even though there is a high ratio of carbonyl compounds to unsaturated hydrocarbons in the aqueous stream 5.

The separator D may be any suitable apparatus or combination of apparatus for separating the unsaturated hydrocarbons from the aqueous composition. The unsaturated hydrocarbon may be separated such as either by heating the aqueous composition or by reducing the pressure on the composition or by a combination thereof. Generally in the separator at least 50 mol percent of the unsaturated hydrocarbons in 5 are recovered as 6 and at least 90 mol percent of the carbonyl compounds in 5 are in the aqueous composition discharged as stream 8.

The unsaturated hydrocarbon 6 may be recycled upstream to feed 3 or may be treated separately or recycled otherwise. The unsaturated hydrocarbon stream 7 may then be further purified and separated into components in the purification Section E, such as by fractional distillation. The product 9 is a high purity unsaturated hydrocarbon containing only an insignificant quantity of carbonyl compounds, such as less than 250 molar p.p.m. and more preferably less than 100 molar p.p.m. carbonyl compounds based on the unsaturated hydrocarbons.

The invention can best be illustrated by a specific example. Reference is made to the drawing for the various pieces of equipment and streams. Butene-2 is dehydrogenerated to butadiene-1,3 in Reactor A. The feed 1 to the reactor consists of butene-2, air and steam. The effluent 2 from the reactor comprises butadiene-1,3, unreacted butene, carbonyl compounds, steam, noncondensable gaseous components such as nitrogen and various dehydrogenation by-products such as $CO_2$. After cooling and removal of some of the water, the composition 3 consists of 71.1 mol percent noncondensable gases (mostly nitrogen, but also includes the other residual gases of air, as well as CO and $CO_2$) and 28.1 mol percent hydrocarbons. The hydrocarbon portion is constituted mostly of $C_4$'s and it comprises 57 mol percent butadiene-1,3. The composition 3 also contains 0.6 mol percent water as steam and 0.2 mol percent carbonyl compounds. The breakdown of the carbonyl compounds by mol percent is as follows: 1.48 percent acetaldehyde, .035 percent acrolein, .009 percent methacrolein, .005 percent crotonaldehyde, .002 percent methyl vinyl ketone and .001 percent formaldehyde. The molecular weight of the gaseous stream 3 is about 36 and the temperature of the gaseous feed is 100° F. The contacting zone C consists of a tray type tower having 40 actual trays. The boiler blowdown 4 fed at the top of the tower has a temperature of 92° F. and a pH of about 11.5. The boiler blowdown contains 304 weight p.p.m. of phenolphthalein alkalinity (calculated as $CaCO_3$) 327 weight p.p.m. methyl orange alkalinity (calculated as $CaCO_3$), 570 weight parts per million chlorine (calculated as NaCl), 7 weight parts per million sulfite, 47 weight parts per million $SiO_2$ and has 1718 weight parts per million total dissolved solids. The overhead temperature of the column is 92° F. and the bottoms temperature of the column is 95° F. The overhead pressure of the column is 127 p.s.i.g. and the bottoms pressure is 133 p.s.i.g. The feed rates of the gaseous composition 3 and the aqueous composition 4 are equivalent to 1.7 mols of water from the aqueous composition 4 per mol of the gaseous composition 3. In the contacting zone C, 99.6 mol percent of the carbonyl compounds and 0.2 mol percent of the hydrocarbons in the gaseous composition 3 are absorbed in the aqueous composition 5. The bottoms aqueous composition 5 consists of 0.11 mol percent carbonyl compounds and 0.04 mol percent hydrocarbons. The pH of the aqueous composition 5 is about 6.0.

The aqueous composition 5 is then transferred to the separator D. The separator D is a horizontal cylindrical vessel. The inlet stream 5 is admitted to the vessel near one end. Near the inlet end of the vessel is a vertical baffle. The pressure in the separator is maintained at 17 p.s.i.a. and the temperature is maintained at 110° F. by the introduction of a hot water stream to D. The flashed vapors leave the separator through a nozzle located at the top of the vessel midway between the ends. The liquid stream 8 from the separator leaves through the bottom of the vessel at the end opposite the gaseous inlet. The gaseous composition 6 leaving the separator contains equivalent to 75 mol percent of the hydrocarbons entering the separator as 5. Only 0.5 mol percent of the carbonyl compounds entering the separator as 5 are taken overhead in the gaseous stream 6. The remainder of the carbonyl compounds leave the separator in the aqueous composition 8.

The gaseous composition 6 containing the unsaturated hydrocarbons is recycled to feed 3. The gaseous composition 7 from zone C then has the following mol percent composition: 71.3 percent noncondensable inert gases, 28.1 percent hydrocarbon, 0.06 percent water as steam and less than 0.3 mols of carbonyl compounds per million mols of gaseous composition 6.

This gaseous composition is then separated and purified in order to produce butadiene-1,3 of high purity in the purification zone E.

I claim:

1. A process for the purification of a gaseous organic compound other than carbonyl compound contaminated with a minor portion of carbonyl compounds which comprises intimately contacting the said gaseous organic compound with boiler blowdown under conditions such that the major portion of the said carbonyl compounds dissolve in the said boiler blowdown and the said carbonyl compound is thereby separated from the said organic compound.

2. The method of claim 1 wherein the said boiler blowdown is at a temperature of at least about 200° F. prior to contacting the said organic compound and the aqueous composition leaving the contacting zone and containing the carbonyl compounds dissolved therein has a pH of no greater than 7.5.

3. A process for the purification of a gaseous organic compound other than oxygenated compound contaminated with a minor portion of carbonyl compounds which comprises intimately contacting the said gaseous organic compound with an aqueous liquid composition having a pH of at least about 10 and comprising from 250 to 7500 weight parts per million dissolved solids and the said aqueous liquid composition having a phenophthalein alkalinity calculated as $CaCO_3$ from about 100 to 1000 weight parts per million, the methyl orange alkalinity calculated as $CaCO_3$ from about 100 to 1000 weight parts per million sulfite from .5 to 100 weight parts per million calculated as $SO_3$ and silica from 15 to 450 weight parts per million calculated as $SiO_2$ and thereby dissolving the said oxygenated contaminant in the said aqueous liquid composition to separate the oxygenated compound from the said gaseous organic compound.

4. A process for the purification of unsaturated aliphatic hydrocarbons contaminated with aliphatic carbonyl compounds from a gaseous mixture having exclusive of any water present from about 3.5 to 80 mol percent of the said unsaturated hydrocarbon and from about 20 to 93 mol percent of noncondensable gases which comprises (1) intimately contacting the said gaseous mixture with an aqueous composition of a pH of at least 10 in a contacting zone, the said contacting zone being maintained at a temperature from at least the dew point of the said unsaturated hydrocarbon to less than the boiling point of water under the conditions in the contacting zone, the said aqueous composition comprising at least 200 weight parts per million dissolved solids and having a phenolphthalein alkalinity calculated as $CaCO_3$ of at least 50 weight parts per million a methyl orange alkalinity of at least 50 weight parts per million chloride calculated as NaCl and at least 10 weight parts per million silica calculated as $SiO_2$.

(2) taking off from the said contacting zone exclusive of any water present a gaseous mixture comprising from about 3.5 to 80 mol percent of the said unsaturated hydrocarbon and from about 20 to 93 mol percent of the said inert noncondensable gas, (3) removing an aqueous solution from the contacting zone, the said aqueous solution having a pH of no greater than 8 and containing dissolved therein based on the total mols of the aqueous solution from about 0.01 to 2.5 mol percent carbonyl compounds and from 0.005 to 0.5 mol percent of the said unsaturated hydrocarbon, the said carbonyl compound dissolved in the aqueous solution being equivalent to at least about 90 mol percent of the carbonyl compound entering the contacting zone in the said gaseous mixture, and (4) purifying the said gaseous mixture taken off in step (2) to produce purified unsaturated hydrocarbon containing only minute quantities of the said carbonyl compounds.

5. The method of claim 4 wherein the said aqueous composition is boiler blowdown.

6. The method of claim 3 wherein the said organic compound is an acyclic unsaturated aliphatic hydrocarbon of 3 to 6 carbon atoms.

7. The method of claim 4 wherein the said organic compound is selected from the group consisting of butadiene-1,3, isoprene and mixtures thereof.

8. The method of claim 4 wherein the said aqueous solution of step (3) is heated in a separate step to a temperature at least high enough to strip dissolved unsaturated hydrocarbons from the said aqueous solution.

References Cited
UNITED STATES PATENTS 3,041,135    6/1962    Chittum et al. _____ 23—3

DELBERT E. GANTZ, *Primary Examiner.*

G. E. SCHMITKONS, *Assistant Examiner.*